United States Patent
Choi et al.

(10) Patent No.: US 10,421,056 B2
(45) Date of Patent: Sep. 24, 2019

(54) FABRICATION METHOD OF PRINT HEAD FOR MULTIPLEX CHEMOTYPING MICROARRAY

(71) Applicant: KOREA INSTITUTE OF SCIENCE AND TECHNOLOGY, Seoul (KR)

(72) Inventors: Sun Choi, Seoul (KR); Chan Hyuk Park, Seoul (KR); Young Haeng Lee, Seoul (KR)

(73) Assignee: KOREA INSTITUTE OF SCIENCE AND TECHNOLOGY, Seoul (KR)

( * ) Notice: Subject to any disclaimer, the term of this patent is extended or adjusted under 35 U.S.C. 154(b) by 331 days.

(21) Appl. No.: 15/407,977

(22) Filed: Jan. 17, 2017

(65) Prior Publication Data

US 2017/0368526 A1 Dec. 28, 2017

(30) Foreign Application Priority Data

Jun. 24, 2016 (KR) ........................ 10-2016-0079404

(51) Int. Cl.
 *B41J 2/16* (2006.01)
 *B01J 19/00* (2006.01)

(52) U.S. Cl.
CPC ........... *B01J 19/0046* (2013.01); *B41J 2/162* (2013.01); *B41J 2/1626* (2013.01);
(Continued)

(58) Field of Classification Search
CPC ........ B41J 2/162; B41J 2/1626; B41J 2/1629; B41J 2/1631; B01J 19/0046; B01J 2219/0038; B01J 2219/00385; B01J 2219/00587; B01J 2219/00612; B01J 2219/0074; B01J 2219/00759;
(Continued)

(56) References Cited

U.S. PATENT DOCUMENTS

| 6,402,301 B1 * | 6/2002 | Powers | ................. B41J 2/1603 347/63 |
| 2015/0111321 A1 * | 4/2015 | Minami | ................. B41J 2/1603 438/21 |

FOREIGN PATENT DOCUMENTS

WO   WO 2014-134228 A1 *   9/2014

* cited by examiner

*Primary Examiner* — John A McPherson
(74) *Attorney, Agent, or Firm* — Novick, Kim & Lee, PLLC; Jae Youn Kim

(57) ABSTRACT

Provided is a fabrication method of print head of MCM device formed micro patterned air gap capable of picoliter-scale droplet printing, and more particularly, is characterized in that comprising preparing silicon wafer 10 washed by piranha solution at step A, stacking silicon nitride films 20 and 20' up front surface and back surface of prepared silicon wafer at step B, drying after applying photoresists 30 and 30' to top surface and bottom surface of the silicon nitride film 20 and 20' at step C, removing partially the photoresists through pre-determined pattern by irradiation of ultraviolet after arranging photomask 40 formed through pre-determined pattern in any one side of the photoresists 30 and 30' at step D, forming sample droplet storage space opening by removing silicon nitride film 21 contacted to photoresists removed by pre-determined pattern at step E, removing the photoresists 30 and 30' stacked up the silicon nitride film 20 and 20' at step F, forming sample droplet storage space 50 by etching the silicon wafer at step G, and forming sample droplet opening 60 by irradiating ultrasonic waves at step H.

13 Claims, 6 Drawing Sheets

(52) U.S. Cl.
CPC .................. *B01J 2219/0038* (2013.01); *B01J 2219/0074* (2013.01); *B01J 2219/00385* (2013.01); *B01J 2219/00587* (2013.01); *B01J 2219/00612* (2013.01); *B01J 2219/00759* (2013.01)

(58) Field of Classification Search
CPC ............... B01L 3/0262; B01L 2200/12; B01L 2300/0819; B01L 2300/0893
See application file for complete search history.

(a) High-throughput samples are loaded to a printing head.

(b) The printing head is contacting a hydrophobic surface.

(c) High-throughput droplets are being transferred by pinch-off.

(d) High-throughput droplets are transferred.

(e) High-throughput samples are printed on a surface.

FABRICATION METHOD OF PRINT HEAD FOR MULTIPLEX CHEMOTYPING MICROARRAY

FIELD

The present invention relates to a MCM (multiplex chemotyping microarray) device, and more particularly, to a fabrication method of the MCM device formed with silicon based micropatterned air gap capable of picoliter-scale droplet printing.

DESCRIPTION OF THE RELATED ART

Technology for producing bioenergy using lignocellulosic biomass has attracted great attention in recent years. The increased promise of developing cost-effective bioenergy solutions from lignocellulosic biomass has brought the generation of tens of thousands of natural and induced variations in energy crops weekly, and a widespread need of rapid and high throughput and large scale analytical methods to screen for the promising ones.

One common analytical technology is use of mid-or/and near-infrared spectroscopy to identify, to quantify, and to assay the plant cell wall composition of the plant starting as well as ending materials. The quality and accuracy of measurements of materials, however, critically affected by the quality of sample preparation.

That is, a preparation process of samples to apply the current infrared spectroscopy is usually method of using KBr pellet, in which actually, long time is required and it has huge influence on IR signal intensity and different shapes of spectrum.

Also, as an obstacle to high efficiency FTIR sampling, restrictive depth of penetration may be considered. Actually, in the case of leaves or stems without any process, only epidermal cells forming outside of plant cells are observed, therefore there is a limit regarding data analysis with respect to wavelength.

Meanwhile, following bioenergy crops as of tendency to use bio hydrocarbon, biodiesel, and biogas as alternative energy has been increased, thus need of monitoring bio metabolism process that generates these materials may be required. As objects of specific analysis, bio-algae, aerobic or anaerobic bacteria, food waste leachates, urban sewage, sludge, heavy metal, etc. may be considered. The most common monitoring method with reference to those materials may be considered as gas chromatography.

In order to cope with the problem found in the traditional analysis method as described above, analysis methods that utilizes printing technology, based on evaporation-induced self-assembly method has been studied in recent years. A printing head which is composed of porous film manufactured through MEMS (Micro Electro-Mechanical Systems, MEMS) technology enables loading thousands of samples and printing as well as multiplex printing possible at a time. Samples to be measured, i.e. organic materials such as plant particles, air pollution particles, soil particles, microorganism, cells, viscous fluid, condensed protein, non-uniformed biomolecules(e.g. semen, plasma, cell hydrolysates), various inorganic materials such as titanium, chromium, vanadium or arsenic are injected to sample storage space of liquid(or solution)-dispersed print head.

Continuous printing method using sample injected-print head starts with immersing the porous film of the print head by interface of fluid, followed by contacting the print head entirely with the substrate, followed by moving some part of the fluid to the substrate caused by pulling interface of the fluid immersed porous film by surface tension of the substrate, followed by moving picoliter-scale fluids to the substrate through a pinch-off process, and at last, followed by forming particles into three-dimensional structure by rapid evaporation-induced self-assembly.

Also, the prepared samples are analyzed by commonly known analysis apparatus or analysis methods such as FTIR spectroscopy, mass spectrometry, emission spectroscopy, breakdown spectroscopy, SEM, etc, thereby not only analyzing a number of sample in a short time but improving reliability of analysis results in high reproducibility.

SUMMARY

The present disclosure is devised to improve application possibility of multiplex chemotyping microarray (MCM) device that includes the print head, and is directed to provide a fabrication method of the print head capable of reducing manufacturing cost and operating cost by simplifying the fabrication method of the print head.

A fabrication method of print head of the present invention to manifest the above object is comprise steps for preparing silicon wafer 10 washed by piranha solution at step A, stacking silicon nitride films 20 and 20' up front surface and back surface of prepared silicon wafer at step B, drying after applying photoresists 30 and 30' to top surface and bottom surface of the silicon nitride film 20 and 20' at step C, removing partially the photoresists through pre-determined pattern by irradiation of ultraviolet removing partially the photoresists through pre-determined pattern by irradiation of ultraviolet through predetermined pattern in photoresists 30 and 30' after arranging photomask 40 to any one side of the photoresist at step D, forming sample droplet storage space opening by removing silicon nitride film 21 that had contacts the photoresists removed by pre-determined pattern at step E, removing the photoresists 30 and 30' that stacks up the silicon nitride film 20 and 20' at step F, forming sample droplet storage space 50 by etching the silicon wafer at step G, and forming sample droplet opening 60 by irradiating ultrasonic waves at step H.

Further, the fabrication method of the present invention may comprise coating walls of storage space 50 of the silicon wafer and surface of the silicon printing nitride films 20 and 20' with hydrophobic polymer after the step H.

Here, the silicon wafer may be 500-600 μm in thickness and 4 to 6 inches of diameters, and also the nitride films 20 and 20' may be 50-400 nm in thickness.

Also, in the fabrication method of the print head of the present invention, drying condition of the step C may heat about 1 to 5 minutes at 85-95° C.

Further, in the fabrication method of the print head of the present invention, the etching condition of the step G may be performed with 5% (v/v) of KOH solution maintained at 80-90° C. or TMAH (Tetramethylammonium hydroxide) solution for 7 to 9 hours.

Also, in the fabrication method of the print head of the present invention, the hydrophobic polymer in the step I may be FOTS (Fluoroctatrichlorosilane) or Teflon.

Also, in the fabrication method of the print head of the present invention, the diameter of opening of the sample droplet opening 60 may be 2-1000 μm.

Also, the present invention provides a multiplex chemotyping microarray device including the fabricated print head by the fabrication method above.

In addition, the present invention provides a method for measuring characteristics of sample using the multiplex chemotyping microarray device and a method for concentrating samples.

Herein, the samples may be organic particles or inorganic particles.

A fabrication method of the print head according to the present invention irradiates the ultraviolet only to any one side of the top surface or the bottom surface of the silicon wafer, thereby having advantages of not only reducing manufacturing time compared to the conventional fabrication method that irradiates both the top surface and the bottom surface of the silicon wafer but also skipping backside alignment which is regarded as the most difficult process.

Also, ultraviolet energy needed for irradiation of the ultraviolet and one step of RIE (Reactive Ion Etching) decreases, thereby saving operating cost thereof, time, and energy.

In addition, in the fabrication method of the print head, there is an effect of preventing breakdown of silicon nitride membrane because sample droplet storage space is completely opened and reducing manufacturing cost compared to the conventional fabrication method that prepares a separate photomask to form sample droplet storage space and droplet opening because only one photomask is needed for forming sample droplet storage space.

DETAILED DESCRIPTION OF THE EMBODIMENT

Figure 1:
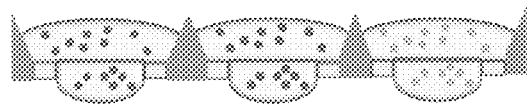
FIG. 1 is a schematic diagram that illustrates a phenomenon occurred in the process of printing samples using MCM.
Figure 1:
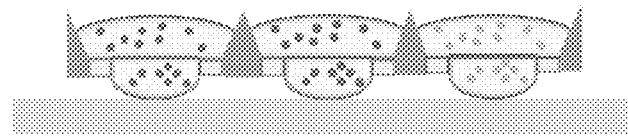
Figure 1:
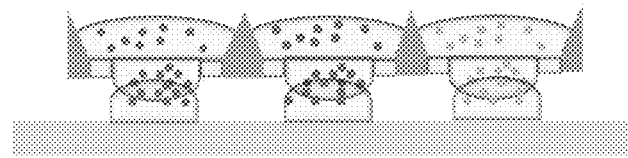
Figure 1:
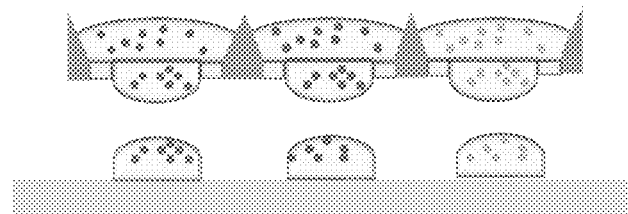
Figure 1:

Hereinafter, the fabrication method of the print head for the multiplex chemotyping microarray according to the present invention will be described by referring appended drawings.

The terms such as "include", "have" or "provide" which are described herein, are used to designate that feature, numbers, steps, elements, components or combination thereof described in the specification that exists, but in contrast, it shall be understood that they are not to exclude the existence of other one or more other features, numbers, steps, operation, elements, components or combinations thereof or additional possibility in advance.

Also, unless it is defined differently, the terms used herein including technical or scientific terms have the same meaning as that to be understood by those skilled in the art. Terms defined in dictionary used in common shall be understood that they have meanings which are coincidenced with contextual meaning of related art and shall not be understood as idealistic or excessively formal meaning unless it is clearly defined in the specification.

Biomass raw material, plants, and non-uniformed mixture are very difficult to be handled, experimentally. However when the multiplex chemotyping microarray (MCM), which is an analysis method using porous film fabricated by MEMS technology as described above is used, it is useful for analyzing various samples in a short time.

This multiplex chemotyping microarray (MCM) device consists largely of a print head formed into air gap on a silicon base for printing after receiving sample with micro pattern, an optical substrate formed with hydrophobic surfaces, and an actuator to drive the contact of the print head to the surface of the optical substrate.

Describing with reference to the print head in detail, the print head consists of a wafer-scale substrate having air gap, and the print head may be a silicon substrate consisting of silicon and silicon nitride to retain rigidity, and also the micro pattern may be achieved by applying the conventional MEMS technology to the silicon substrate.

In an exemplary embodiment, air gaps of the print head may have 2 μm to hundreds of nm, more particularly, 10-20 μm, 40-60 μm, 60-80 μm or 80-100 μm in diameter or at length.

Distance of the air gaps therebetween may be varied depending on size of sample cluster, as an exemplary embodiment, it may be formed with 400 μm to 500 μm of gap or larger gap.

Also, the design of the print head determines the shape of final pattern that are to be printed on the optical substrate and standard of the sample, droplet with the picoliter scale may cover an area of about 50 μm×50 μm, and number of the sample storage space of the print head may be determined depending on the number of the samples and capacity.

The optical substrate may consist of silicon, metal, or alloy, etc., and as an exemplary embodiment the optical substrate may consist of general material or coated material and may have transparent or reflecting properties in mid-infrared range.

Also, the surface of the optical substrate may be treated specially in order to increase hydrophobicity. The hydrophobic materials may be coated on the surface of the optical substrate through commonly known method such as deposition, etc., and as for preferred materials, FOTS (Fluoroctatrichlorosilane), Teflon, or any kinds of hydrophobic materials are possible.

Besides as described above, the optical substrate and the print head may consist of materials coated with polymer capable of reflecting in the mid-infrared. For example, after coating with materials for improving contact such as chromium or titanium in substrates consisting of polymer, secondary coating with such as thin gold or aluminum, silver may be done.

Meanwhile, print process of sample using MCM (after loading sample) may include three processes (A-C) as follows.

A. Before contacting print: in the case of droplet that protrudes from film through the air gap, it is balanced with gravity of the droplet, friction force of the droplet, and surface tension of the droplet before contacting the optical substrate.

B. Middle of contacting: when fluid interface of the droplet contacts with substrate, it protrudes from the film through the air gap, and pressure sensor under the optical substrate detects applied pressure and raise the print head again. During a short time when the droplet contacts with the substrate gap between the head and the substrate functions as a capillary tube flow passage, and accordingly, the fluid interface of the droplet escapes easily from the storage. The gap is estimated at about half of the diameter of the droplet, when the droplet contacts with the substrate, the surface tension of the substrate is to be added to original force balance and positioned on the substrate by pulling a fraction of the droplet in the head.

C. After contacting: after moving the droplet to the substrate, particles in the droplet are gathered in the middle and formed to cluster.

These arrangements of particles are formed by mutual-capillary gravitation driven by the evaporation of liquid. With reference to the aforementioned phenomenon describing in more detail by referring to FIG. 1, printing using the print head depends on gravity, surface tension, and evaporation arrangement as described above. As illustrated in step 1 of FIG. 1, sample droplet protrudes from the print head. After the dispersed liquid (approximately 0.1 uL~10 uL) is loaded up to the head, the fluid interface of the droplet protrudes from front side of the head by gravity in a second.

Step 2 illustrates contacting the print head with the substrate or a process of contact the droplets with the substrate. By direct contact of the head and the substrate, a number of particles in dispersed liquid droplets with picoliter scale (approximately 20 pL-200 pL) move to the substrate.

Step 3 illustrates the print head spaced from the substrates after sample droplets are flowed out the substrate. Due to hydrophobicity of the substrate, the sample droplets are to be gathered each other. In step 4 samples are concentrated in a suitable form for analysis by evaporating liquid in sample.

Here, every print process may be terminated between 5 seconds and 10 seconds, and such print technology may produce micro/nanoparticle clusters with micrometer scale which is smaller and more uniform than the conventional KBr mixture pellet method or general inkjet printing. Since accurate control of volume of droplet sprayed with picoliter scale and rapid evaporation of the dispersed droplet processing capacity may increase and also dense forming the particles is possible. A phenomenon that clusters different sizes of the particles allows different sizes of particles to gather a corn-shaped cluster finely, and this is based on a phenomenon that fills small particles between air gaps formed at large particles automatically, also with these phenomena, geometric uniformity between the clusters of the sample particles may be improved.

In the meantime, in another exemplary embodiment, the MCM technology may be used as a concentrating means of the samples. That is, samples having low concentration or very diluted samples are printed repeatedly, thereby concentrating the samples (perform step 3 and step 4, repeatedly in FIG. 1).

Further in an exemplary embodiment, sizes and heights of the sample cluster printed by changing size of air gap in the film may be changed.

Meanwhile, the samples may mean concentrated mixture having high viscosity of plants particle that corresponds to 50, air pollution particles, soil particles, colloids of which size is less than 50 nm, protein, biomolecules (e.g. saliva, semen, and cell hydrolysates) of which size corresponds to 50 nm to 20 μm. Describing in more detail, the samples may include plant biomass, grain material, protein, air pollution particle, soil or geological sample, water sample, drug sample, virus particle/DNA, microbe sample, biological or tissue sample, biomolecule, DNA, nucleic acid, protein, enzyme, and printed electronic device, but they are not limited therefrom.

Aside from this, printing may be done by dispersing mineral nanoparticles to carrier matrix or liquid. Detailed mineral nanoparticles may be cited as examples titanium, chromium, vanadium or arsenic, but they are not limited by those materials. Also, those particles have standard of dozens of micro and may be viscous fluid.

Various samples as like the above may be printed after dispersing the carrier matrix or the liquid, and preferred matrix or liquid are cited as water, organic solvent, mineral oil, gel, or other buffer solution, but they are not limited by those materials.

As described above, droplets that contains the samples are printed on the substrate, the formed samples after the carrier matrix or liquid are evaporated may be measured by a commonly known method according to samples components, and analysis method thereof may use FTIR (Fourier transform infrared) spectroscopy, SEM, LA-ICP-AES (Laser Ablation-Inductively-Coupled Plasma Atomic Emission Spectroscopy), LIBS (Laser-Induced Breakdown Spectroscopy), SEM(Scanning Emission Microscopy), etc., but they are not limited by those methods.

Figure 2:
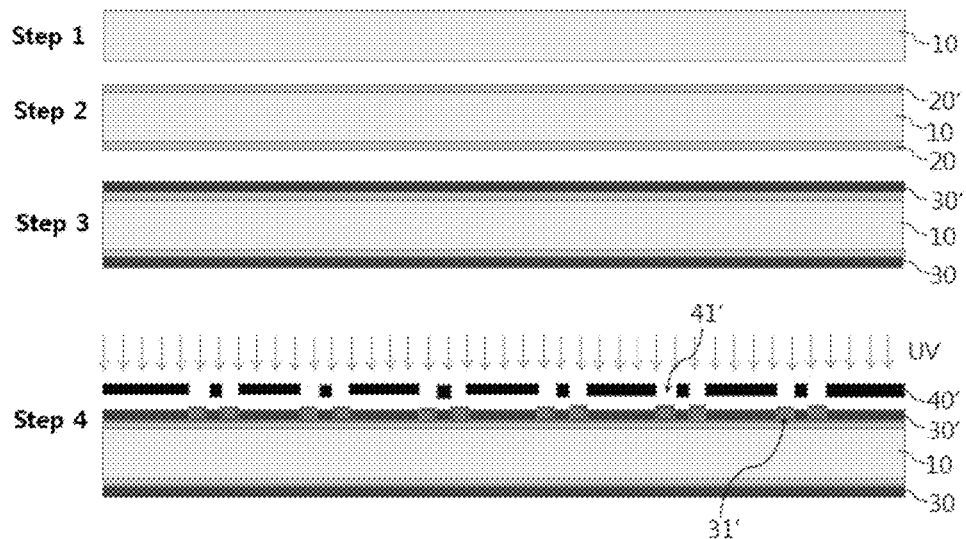
FIGS. 2 to 4 are schematic diagrams of conventional fabrication method of print head.
Figure 3:
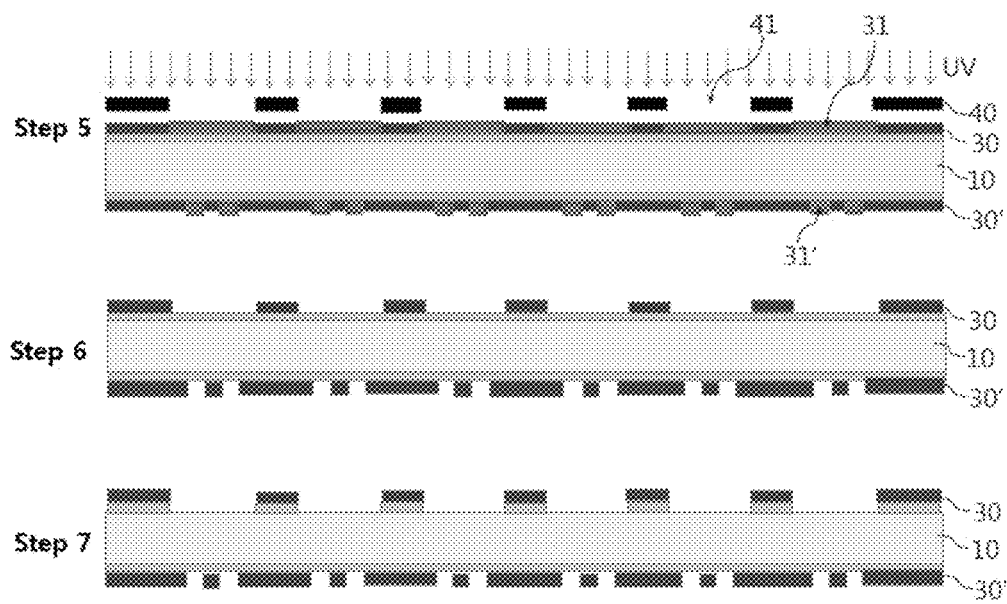

Meanwhile, the print head of the MCM device has been manufactured by steps as follows. Being described by referring to FIGS. 2 to 4 in detail, it consists of preparing a silicon wafer 10 washed by piranha solution as a material of the print head at step 1, depositing silicon nitride films 20 and 20' having low stress to top/bottom side of the silicon wafer at step 2, drying by heating after spin coating the top side and bottom side of the wafer 10 through photoresists 30 and 30' at step 3, exposing after arranging a first photomask 40' formed predetermined pattern 41' to the top side or bottom side of the wafer in order to form opening of sample droplet at step 4, exposing to ultraviolet light after arranging a second photomask 40 to other side which is not arranged the first photomask 40' in order to form storage space 50 which the sample droplet is received at step 5, removing the photoresists 31 and 31' of top side and other side exposed to the ultraviolet light at step 6, removing the first photomask 40' and silicon nitride film formed pattern by irradiation of the ultraviolet light at step 7, removing the second photomask 40 and the silicon nitride film formed pattern by irradiation of the ultraviolet light at step 8, removing the remaining photoresists 30 and 30' to the top side and the bottom side of the silicon wafer at step 9, forming sample droplet storage space 50 and sample droplet opening 60 by removing silicon at bulk portion through wet etching at step 10, and coating with hydrophobic polymer 40 to the top side and the bottom side of the wafer and walls in the sample droplet storage at step 11.

The multiplex chemotyping microarray (MCM) analysis method has several advantages, but as described above, the print head that corresponds to key technologies above requires high manufacturing cost as well as long time to fabricate because of very complicated manufacturing processes. Accordingly, these problems are directly connected to analysis cost; therefore, a manufacturing process of the print head is in a need to simplify its manufacturing process.

In the present invention, an innovative fabrication method of the print head that enables to shorten manufacturing time, cost, and level of difficulty in manufacturing processes by simplifying the conventional manufacturing processes of the print head, and reduces energy by performing irradiation of the ultraviolet to any one side of top side or bottom side of the silicon wafer.

Hereinafter, while preferred exemplary embodiment helps understanding of present invention, it is clear that the following embodiments exemplify the present invention, but various changes and modifications are possible, and it is included in the scope of claims attached in the changes and the modifications.

Figure 5:
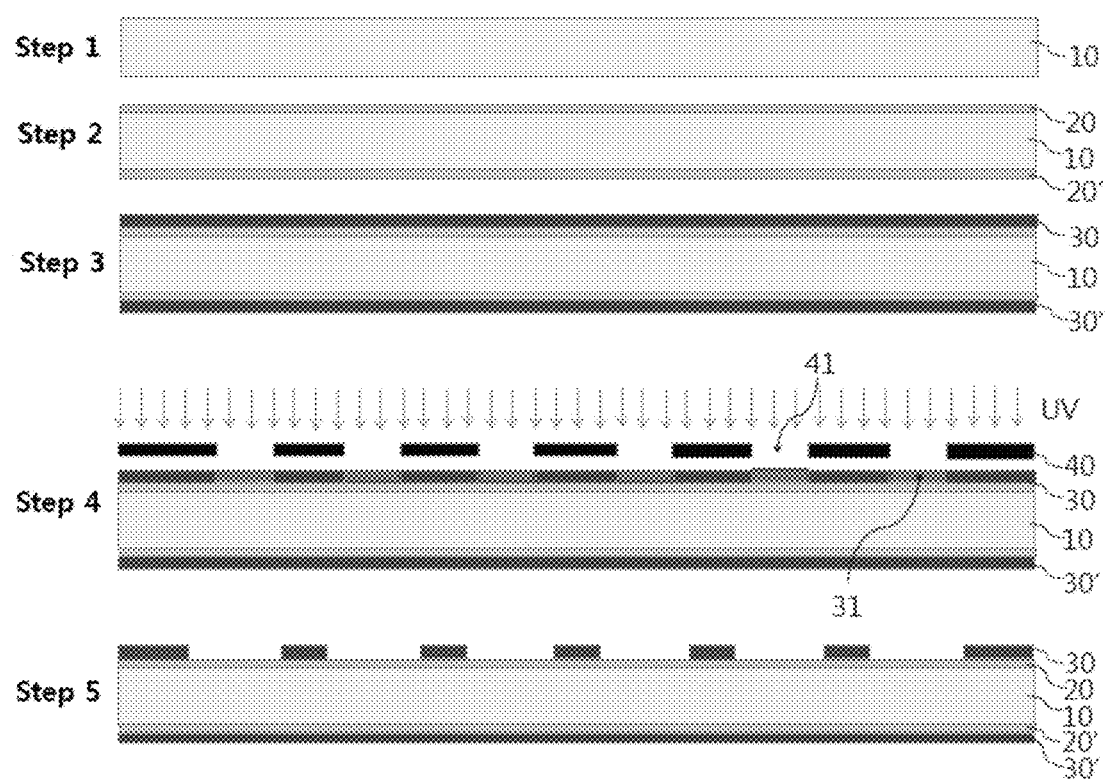
FIGS. 5 to 6 are schematic diagrams of fabrication method of print head according to the present disclosure.

Exemplary Embodiment 1: Fabrication of the Print Head (see FIGS. 5 and 6)

Step 1: Preparing the Silicon Wafer

The silicon wafer 10 washed by piranha solution is used as materials of the print head. Here, the wafer may have about 500-600 μm of thickness and 4 to 6 inches of diameter.

Step 2: Stacking the Silicon Nitride Films 20 and 20' to the Top Side and the Bottom Side of the Silicon Wafer Silicon nitride films 20 and 20' having 50-400 nm of thickness with low stress are stacked up front side and back side of the silicon wafer 10 provided at step 2, and as a stacking method, Low-pressure CVD (LPCVD) was used.

Step 3: Coating with the Photoresists to the Top Side and the Bottom Side of the Silicon Wafer After spin coating with the photoresists 30 and 30' to the top side and the bottom side of the wafer 10 that silicon nitride film 20 and 20' are stacked, and are dried by heating at about 90° C. for 1 minute to 5 minutes.

Step 4: Irradiating the Ultraviolet Light to the Top Side or the Bottom Side of the Silicon Wafer The ultraviolet light is irradiated after arranging the photomask 40 which pre-determined pattern is formed at any one side of the top side or the bottom side of the silicon wafer 10.

Step 5: Removing Photoresists that are Exposed to the Ultraviolet Light

With a method of removing the photoresistor 31, it is not limited and it may be removed by a publicly known method.

Step 6: Removing the Silicon Nitride Film Through the Predetermined Pattern

In order to make the sample droplet storage space 50 of the silicon wafer 10 the opening is provided by removing the silicon nitride film 21 in a way of RIE (Reactive-Ions-Etching) method.

Step 7: Removing Photoresists that Stacks up the Top Side and the Bottom Side of the Silicon Wafer Step 8: Removing the Silicon at the Bulk Portion Through the Wet Etching The silicon at the wafer bulk portion was removed by etching in 5% (v/v) KOH (Potassium hydroxide) or TMAH (Tetramethylammonium hydroxide) solution. In this time, the preferred etching condition is 7-9 hours at 80-90° C. When the wet etching is finished, sample droplet is flowed in one side of the silicon wafer and storage space of the pre-determined pattern that is capable of receiving is formed, and other side is in a state of closing with the silicon nitride film 20'.

Step 9: Forming Opening of the Sample Droplet by Irradiating Ultrasonic Waves

The opening of the sample droplet is formed by irradiating ultrasonic waves to the silicon nitride film 20'. For a detailed method of forming droplet opening 60, after filling medium such as water or isoproposanol in commonly known—digital ultrasonic cleaning bath which has pre-determined storage portion, and set the print head in the washer in a vertical direction, then removes all the silicon nitride films formed in the print head by irradiating ultrasonic wave with 40-60 kHz of frequency for 1-3 minutes.

Figure 4:
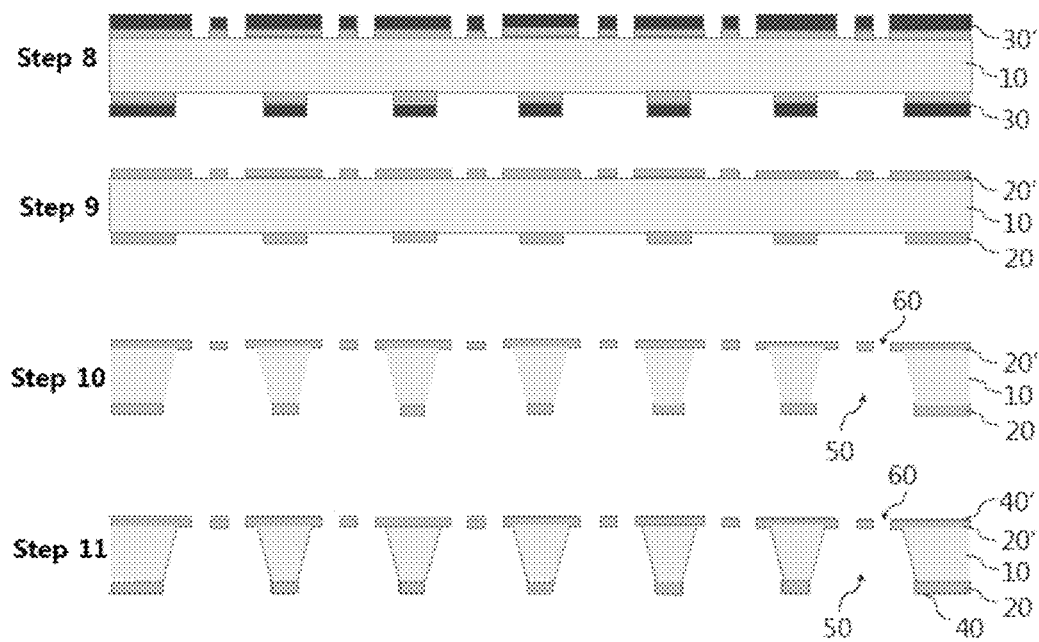
Figure 6:
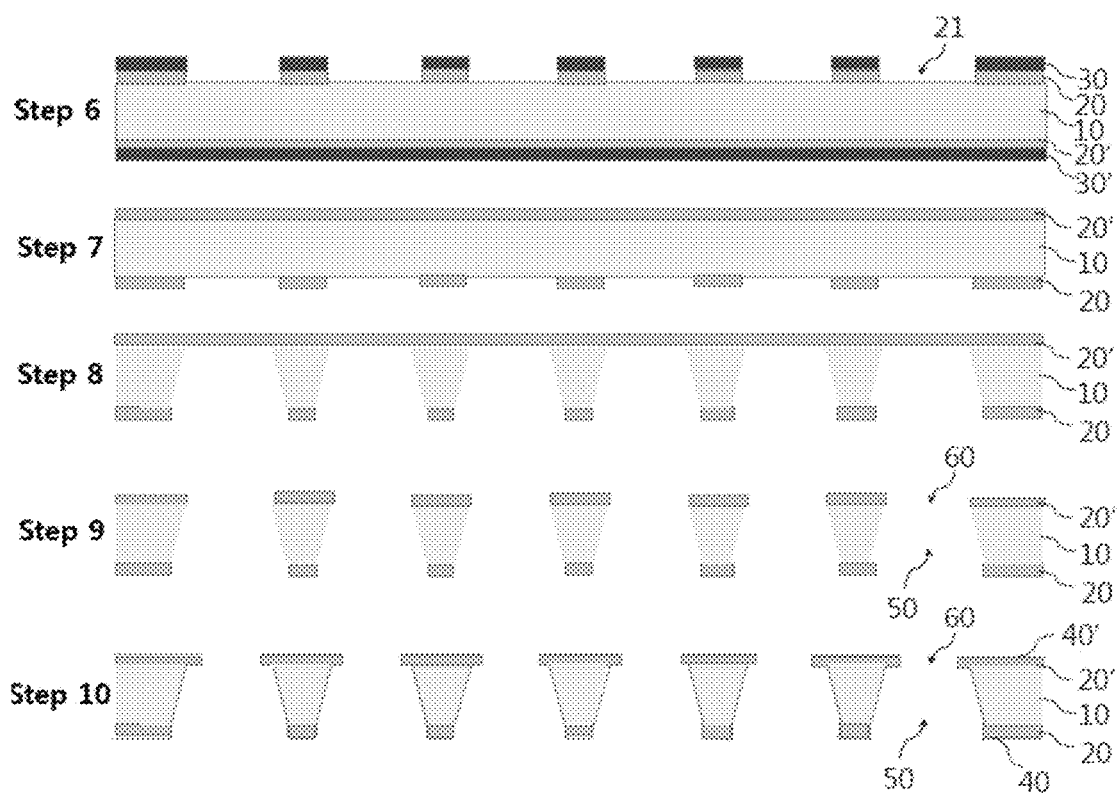

As illustrated in step 10 of FIG. 4, since the print head fabricated by the conventional fabrication method is in a state such that a part of the silicon nitride film 20' is not supported by the silicon wafer 10, it may have concern about breakdown from external impact, but in contrast, since the head for printing fabricated by the fabrication method of the present invention contacts all sides of the silicon nitride film 20', there is no concern about breakdown from external impact (step 9 of FIG. 6).

Step 10: Coating the Silicon Wafer with the Hydrophobic Polymer

Walls forming the storage space 50 of the silicon wafer and the surface of the silicon nitride films 20 and 20' that stacks up the silicon wafer are coated with the hydrophobic polymer 40. Herein, FOTS (Fluoroctatrichlorosilane) single molecule layer or 2-3 nm of Teflon nanofilm is preferred as hydrophobic polymer, and for a coating method chemical deposition may be used, but it is not limited therefrom.

Through the above fabrication method, pre-determined sample droplet storage space 50 and the print head that has droplet opening 60 to which sample droplet is discharged may be obtained, and the fabrication step of exposing the ultraviolet light after arranging the second photomask 40 which was performed in the conventional fabrication method of the print head may be skipped, thereby having advantage of simplifying manufacturing processes, reducing manufacturing time and reducing energy required to irradiation of the ultraviolet light.

Figure 7:
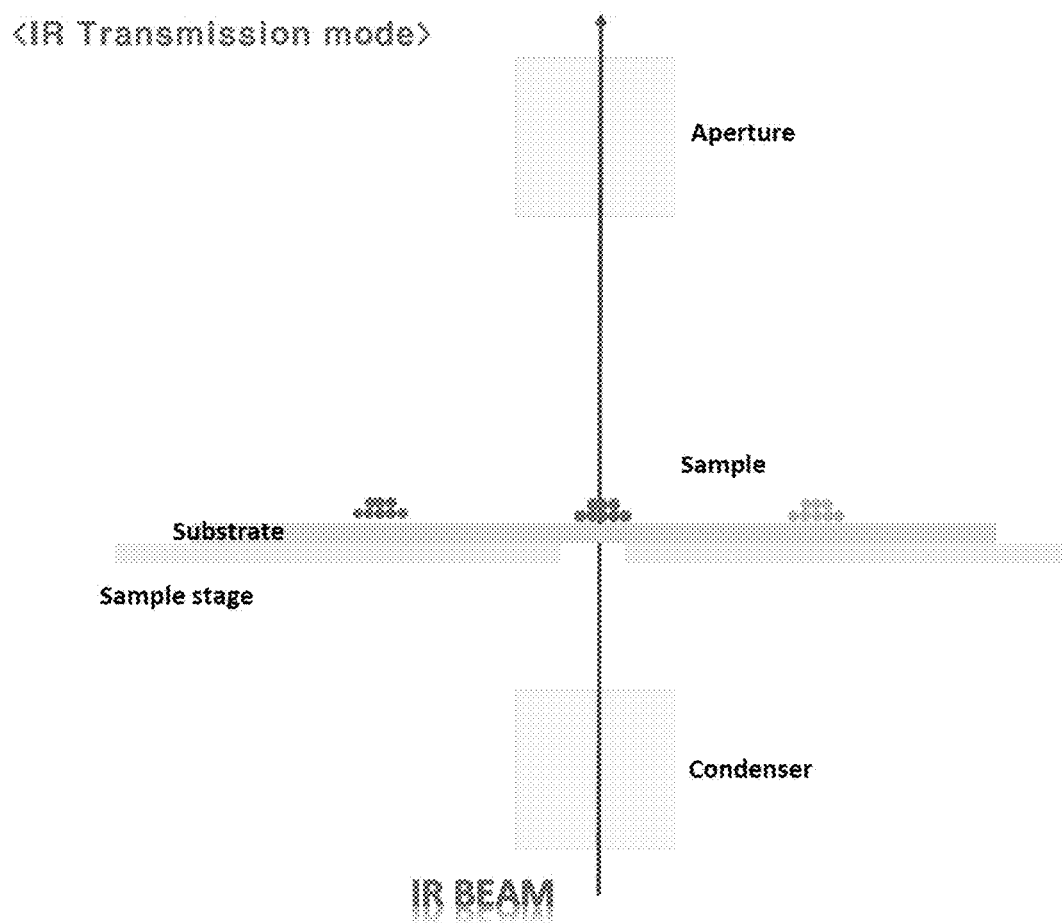
FIG. 7 is a schematic view analyzing samples by a MCM method.

Exemplary Embodiment 2: Particle Analysis of the Bioenergy Crops Using MCM (see FIG. 7)

Step 1: Preparing Hydrophobic Infrared Light Penetrative/Reflective Substrate for Printing Sample Particle-Dispersed Liquid Hydrophobic property of surface of the infrared penetrative/reflective substrate is an essential condition for successful sample printing. In order to increase the hydrophobic property, single molecule FOTS layer is deposited on surface of the substrate by MOCVD (Metal-Organic Chemical Vapor Deposition) method.

Step 2: Preparing Dispersed Liquid of the Bioenergy Crop Particles

After grinding bioenergy crop (*Brachypodium distachyon*) into equal to or less than 100 μm by ball milling, it is dispersed evenly to the liquid (water, buffer fluid).

Step 3: Printing the Bioenergy Crop Particle Dispersed Liquid on Infrared Light Penetrative/Reflective Substrates After the bioenergy crop particle dispersed liquid is injected to the storage in the print head within a range of 1-100 uL, and is printed on substrate. That is, after contacting crop particle dispersed liquid of the print head and the substrate equal to or less than one second the print head resets to original position thereof automatically, so self-clustering of the energy crop particles is completed by evaporating the droplet rapidly after a number of picoliter scale droplets are printed on the hydrophobic substrate.

Step 4: Measuring Printed Crop Sample

Characteristics of sample particles are measured by irradiating an infrared light on formed clusters of crop particles the optical substrate.

While the present invention has been described in connection with specific part, it is to be understood that the invention is only preferred exemplary embodiment to those skilled in the art, and is not limited to the preferred exemplary embodiment, and is intended to cover various modifications and equivalent arrangement included within the spirit and the scope of the appended claims.

What is claimed is:

1. A fabrication method of a print head, the method comprising:

preparing a silicon wafer washed by piranha solution at step A;

stacking silicon nitride films up on a front surface and a back surface of the prepared silicon wafer at step B;

drying after applying photoresists to a top surface and a bottom surface of the silicon nitride film at step C;

removing partially the photoresists through a pre-determined pattern by irradiation of ultraviolet through the predetermined pattern in the photoresists after arranging a photomask to any one side of the photoresists at step D;

forming an opening for a sample droplet storage space by removing a part of the silicon nitride film that contacts the photoresists which is removed by the pre-determined pattern at step E, removing the photoresists that stacks up on the silicon nitride film at step F;

forming the sample droplet storage space by etching the silicon wafer at step G; and forming a sample droplet opening by irradiating ultrasonic waves at step H.

2. The fabrication method of the print head of claim 1, wherein walls of the storage space of the silicon wafer and surfaces of the silicon printing nitride films are coated with hydrophobic polymers in step I after the step H.

3. The fabrication method of the print head of claim 2, wherein the hydrophobic polymers in the step I are FOTS (Fluoroctatrichlorosilane) or PTFE (Polytetrafluoroethylene).

4. The fabrication method of the print head of claim 1, wherein the silicon wafer is 500-600 μm in thickness and 4-6 inches in diameter.

5. The fabrication method of the print head of claim 1, wherein the nitride films are 50-400 nm in thickness.

6. The fabrication method of the print head of claim 1, wherein a drying condition of the step C is characterized by heating for about 1 minute to 5 minutes at 85-95° C.

7. The fabrication method of the print head of claim 1, wherein an etching condition in the step G is performed 7 hours to 9 hours in 5% (v/v) KOH solution maintained at 80-90° C. or TMAH(Tetramethylammonium hydroxide) solution.

8. The fabrication method of the print head of claim 1, of which diameter of the sample droplet opening is 2-1000 μm.

9. A print head that is fabricated by the fabrication method of claim 1.

10. A multiplex chemotyping microarray device that includes the print head of claim 9.

11. A measurement method that characterizes phenotypes of samples by using the multiplex chemotyping microarray device of claim 10, the method comprising irradiating an infrared light on the samples.

12. A method of concentrating samples using the multiplex chemotyping microarray of claim 10, the method comprising evaporating a liquid in the samples.

13. The method of claim 12, wherein the samples are organic particles or inorganic particles.

* * * * *